(12) United States Patent
Tevene'

(10) Patent No.: US 11,476,537 B2
(45) Date of Patent: Oct. 18, 2022

(54) SAFETY AUXILIARY SYSTEM FOR A MODULAR BATTERY IN AN UNDERWATER VEHICLE AND CORRESPONDING BATTERY

(71) Applicant: LEONARDO S.p.A., Rome (IT)

(72) Inventor: Bruno Tevene', Leghorn (IT)

(73) Assignee: LEONARDO S.P.A., Rome (IT)

( * ) Notice: Subject to any disclaimer, the term of this patent is extended or adjusted under 35 U.S.C. 154(b) by 221 days.

(21) Appl. No.: 16/782,270

(22) Filed: Feb. 5, 2020

(65) Prior Publication Data
US 2020/0251706 A1    Aug. 6, 2020

(30) Foreign Application Priority Data

Feb. 6, 2019   (IT) .................. 102019000001735

(51) Int. Cl.
*H01M 10/63*      (2014.01)
*H01M 50/317*    (2021.01)
(Continued)

(52) U.S. Cl.
CPC .......... *H01M 50/317* (2021.01); *B60L 50/66* (2019.02); *B60L 58/26* (2019.02); *H01M 10/0525* (2013.01); *H01M 10/4257* (2013.01); *H01M 10/482* (2013.01); *H01M 10/486* (2013.01); *H01M 10/613* (2015.04); *H01M 10/625* (2015.04); *H01M 10/63* (2015.04); *H01M 10/6561* (2015.04); *H01M 50/20* (2021.01); *H01M 50/375* (2021.01); *B60L 2200/32* (2013.01); *H01M 2010/4271* (2013.01); *H01M 2220/20* (2013.01)

(58) Field of Classification Search
CPC .. H01M 10/613; H01M 10/625; H01M 10/63; B60L 58/26
See application file for complete search history.

(56) References Cited

U.S. PATENT DOCUMENTS 7,433,794 B1 * 10/2008  Berdichevsky ..... H01M 10/486
                                                                 702/130
2013/0316198 A1   11/2013  Bandhauer et al.

FOREIGN PATENT DOCUMENTS

CN     107 623 147    1/2018
EP       3 300 162    3/2018

* cited by examiner

*Primary Examiner* — James Lee
(74) *Attorney, Agent, or Firm* — Leason Ellis LLP

(57) ABSTRACT

A safety auxiliary system, coupled to a modular battery of an underwater vehicle having a number of modules, each provided with a plurality of cells, has: a first subsystem, which detects conditions indicative of a thermal runaway in any of the modules d manages such a thermal runaway, intervening locally on the module to cool the corresponding cells so that the thermal runaway is not propagated; and a second subsystem, cooperating with, and operatively coupled to, the first subsystem, which manages gases present in the module associated with the thermal runaway, preventing them from pouring inside the underwater vehicle. The first subsystem is provided with a first electronic control unit for each of said modules, and the second subsystem is provided with a second electronic control unit, distinct from, and operatively coupled to, the first electronic control unit through a communication connection, so as to receive an alarm signal upon detection of the conditions indicative of the thermal runaway in the corresponding module.

14 Claims, 4 Drawing Sheets

(51) Int. Cl.
*H01M 10/613* (2014.01)
*H01M 10/625* (2014.01)
*H01M 10/6561* (2014.01)
*B60L 50/60* (2019.01)
*B60L 58/26* (2019.01)
*H01M 10/0525* (2010.01)
*H01M 10/42* (2006.01)
*H01M 10/48* (2006.01)
*H01M 50/20* (2021.01)
*H01M 50/375* (2021.01)

SAFETY AUXILIARY SYSTEM FOR A MODULAR BATTERY IN AN UNDERWATER VEHICLE AND CORRESPONDING BATTERY

CROSS-REFERENCE TO RELATED APPLICATIONS

This patent application claims priority from Italian patent application no. 102019000001735 filed on Feb. 6, 2019, the entire disclosure of which is incorporated herein by reference.

TECHNICAL FIELD

The present invention relates to a safety auxiliary system for a modular battery (in particular, a Lithium, Lithium ion or Lithium polymer rechargeable battery), for use in an underwater vehicle (in particular a submarine), and to a corresponding modular battery.

STATE OF THE ART

The issue of safety of rechargeable batteries (in particular Lithium ion or Lithium polymer batteries), comprising one or more modules consisting of a plurality of elementary battery cells, is well known, having been dealt with in many studies, both at academic and industrial level.

The main problem can be summarised as follows: when, for whatever reason, the temperature of a cell of the battery exceeds a certain threshold, a series of highly exothermic reactions are triggered, which can product heat with such high thermal power that the cell is unable to dispose of it towards the outside, even in the presence of optional cooling systems. The temperature of the cell, therefore, increases irreversibly (so-called "Thermal runaway") and this, in turn, produces the formation of hot gases inside the cell itself.

When the pressure of these gases exceeds a certain threshold, the cell casing typically breaks, and in any case gas escapes towards the outside of the cell (so-called "venting" of the cell); very often, the phenomenon concludes with the cell catching fire.

The level of danger of the phenomenon depends on the chemistry of the cell and on the energy content thereof, but in any case all of the Lithium-based rechargeable cells emit toxic gases and contain a flammable electrolyte; none of these cells (even those that use Lithium-Iron-Phosphate technology) may therefore be considered to be "intrinsically safe".

The triggering of thermal runaway takes place in anomalous conditions, which occur for example when the cell is subjected to an "abuse" (electrical, mechanical or thermal). When the increase in temperature of the cell is a gradual phenomenon linked to an excessive charging or discharging current of the cell, the Battery Management System (BMS) is generally able to detect the anomaly and to autonomously control the shut-down of the cell, thereby removing the cause of the heating and preventing the cell from reaching the trigger point of thermal runaway.

When, on the other hand, the increase in temperature is not linked to the charging/discharging current of the cell, the "BMS" cannot intervene in any way to stop it. In this case, if the cell temperature reaches the trigger point of thermal runaway, the situation can become extremely dangerous. As stated, indeed, inside the overheated cell, pressurised gases are generated that may break the outer casing and pour into the environment. If the temperature continues to increase, the cell catches fire and this phenomenon can quickly propagate to the entire battery, especially when the cells are completely charged.

In the case of large batteries (and therefore very high energy content), consisting of a plurality of modules each comprising a plurality of cells, an event of this type should be considered potentially catastrophic, especially when the battery is confined in closed spaces, as happens for example in a vehicle for underwater use (such as a submersible, or more generally any underwater vehicle).

Among the events unable to be controlled by the "BMS" that can lead to triggering of thermal runaway, the most problematic one is certainly the "cell internal short circuit". This is an event the probability of which is generally low, but that in any case is particularly insidious because it is impossible to predict it, i.e. to realise that the cell is close to the formation of such an internal short circuit. Indeed, many studies have been carried out to try to characterise the cell internal short circuit, but without reaching a universally accepted explanation.

Since, at least based on current knowledge, it is not possible to predict thermal runaway, safety systems have been proposed that provide for the use of suitable cooling systems, coupled externally to the battery, to be activated in the case of detection of conditions associated with such a phenomenon.

Such systems are not, however, totally effective, since they are unable to intervene sufficiently quickly and therefore they do not ensure that the damages associated with the aforementioned thermal runaway are contained, particularly in the hypothesis of use in an underwater vehicle.

OBJECT OF THE INVENTION

The purpose of the present invention is to provide a solution that allows to solve the problems outlined earlier and in particular makes it possible to minimise the risk associated with the event of thermal runaway that occurs in one or more cells of the battery.

According to the present invention a safety auxiliary system for a battery and a corresponding battery are provided, as described in the attached claims.

BRIEF DESCRIPTION OF THE DRAWINGS

For a better understanding of the present invention preferred embodiments thereof will now be described, purely as a non-limiting example, with reference to the attached drawings, in which.

PREFERRED EMBODIMENT OF THE INVENTION

As will be made clear hereinafter, one aspect of the present solution envisages providing a modular battery, in particular a rechargeable Lithium battery, with a safety auxiliary system that operates in addition to the (known) safety mechanisms already incorporated in the "BMS" of the battery itself and that has the specific task of blocking the thermal runaway of one or more cells, or at least of minimising the consequences of the same thermal runaway, preventing the propagation thereof to surrounding cells.

Figure 1:
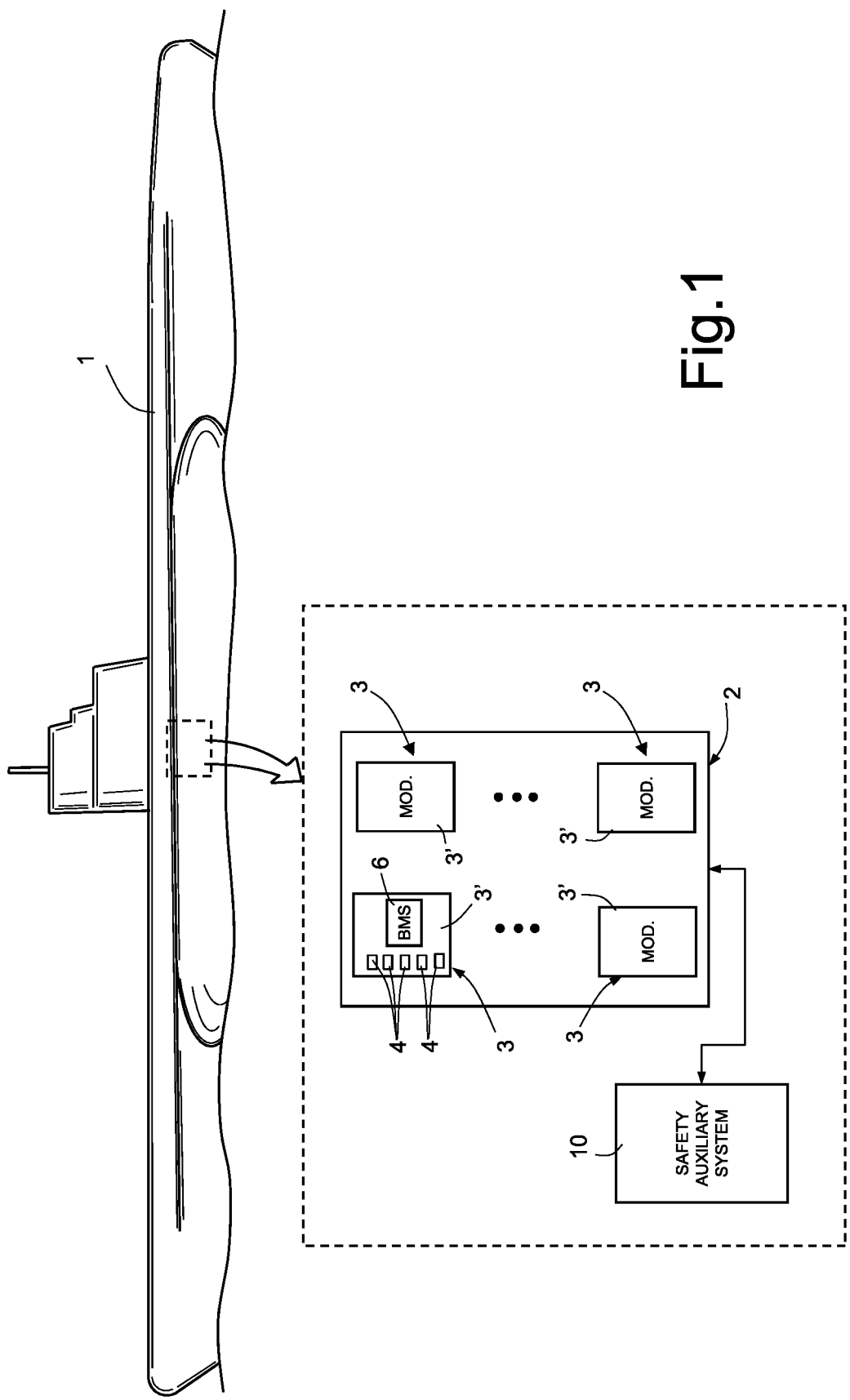
FIG. 1 is an overall block diagram of an underwater vehicle provided with a modular battery.

As schematically illustrated in FIG. 1, the present solution has advantageous, even if not exclusive, application in an underwater vehicle 1 (for example a submarine), provided, for the purposes of the propulsion and/or for supplying electricity to corresponding on-board electrical systems, with a battery 2, in particular a modular rechargeable Lithium battery.

The aforementioned battery 2 comprises a suitable number of modules 3, each containing a plurality of cells 4, and a battery management system ("BMS") 6, of a known type, not described here in detail, comprising a control unit designed for managing the operation of the module 3, in particular corresponding charging and discharging operations.

The modules 3, in which the battery 2 is divided, may for example be the same as one another, so that each module 3 has a limited energy content; every module 3 is also enclosed in a corresponding hermetic container 3', capable of supporting a desired pressure difference between inside and outside, for example of the order of 1-2 Bar.

As indicated earlier, one aspect of the present solution envisages providing the battery 2 with a safety auxiliary system 10, which operates in addition to, and in cooperation with, the "BMS" 6 of the modules 3 of the battery 2 and, in certain conditions, automatically activates to generate a strong and quick cooling of the cells 4 contained in a single module 3 with the purpose of blocking the thermal runaway or in any case preventing the propagation thereof.

In particular, the safety auxiliary system 10 is configured to activate, even repeatedly, whenever at least one of the following events is detected inside any one of the modules 3 of the battery 2:

temperature (of one or more cells 4) exceeding a predetermined threshold;
temperature (of one or more cells 4) increasing with a higher rate than a respective predetermined threshold;
overpressure in the container 3' of the module 3 (consequent to the "venting" of one or more cells 4);
presence of smoke inside the container 3' of the module 3 (again, as a consequence of the "venting" of one or more cells 4).

With reference to the block diagram of FIG. 2, the aforementioned safety auxiliary system 10 will now be described in greater detail, the system being in general divided into two subsystems 10a, 10b that operate in a combined manner and cooperate to ensure the safety of the battery 2:

a first subsystem 10a, configured to detect conditions indicative of a thermal runaway in any one of the modules 3 and to manage such thermal runaway, intervening locally and exclusively on such a module 3, immediately cooling the corresponding cells 4 so that the thermal runaway is not propagated;

a second subsystem 10b, cooperating with, and operatively coupled to, the aforementioned first subsystem 10a, configured to manage the gases that originate in the module 3 (due, at least in part, to thermal runaway), preventing them from pouring out into the closed environment inside the underwater vehicle 1.

Figure 2:
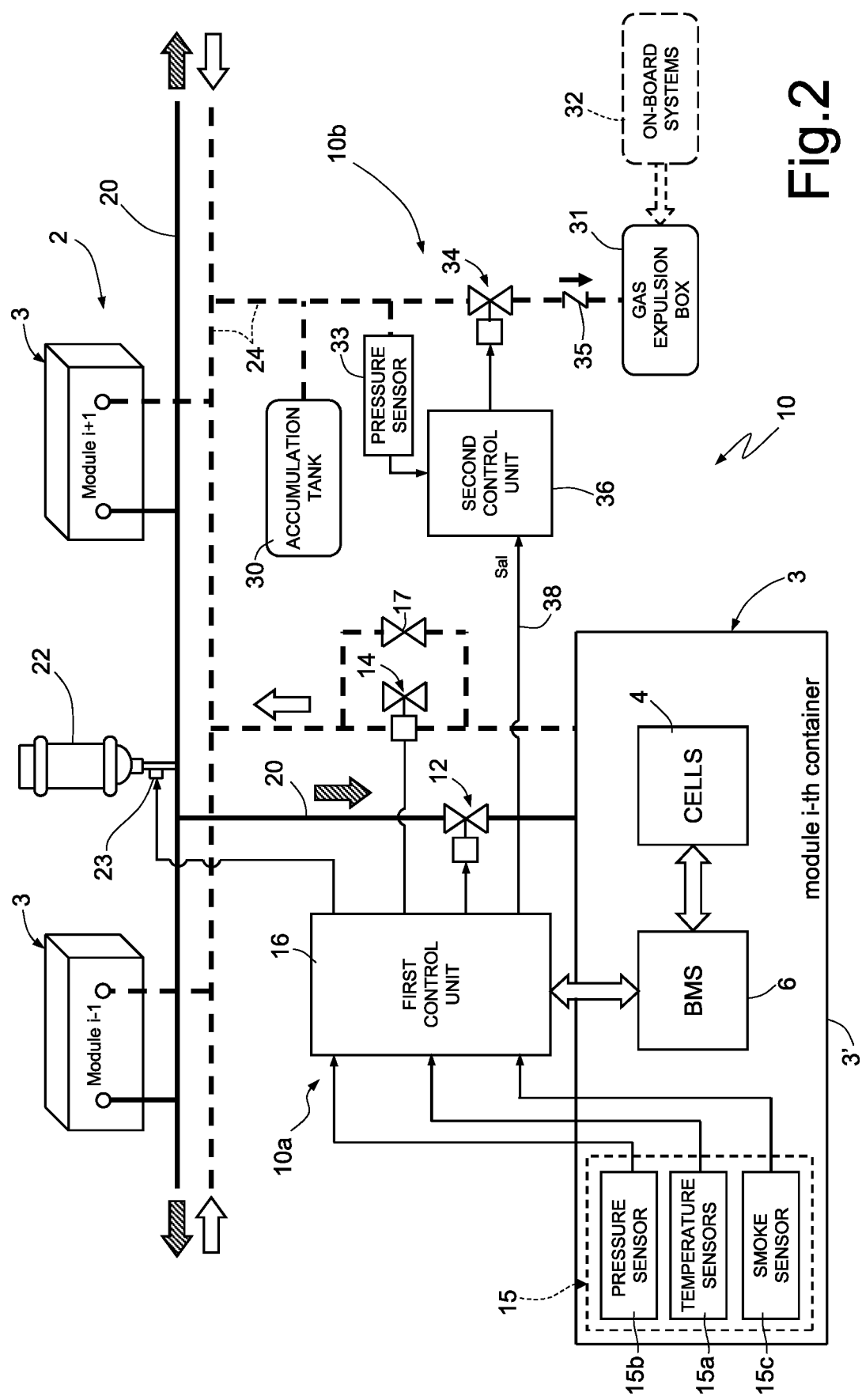
FIG. 2 is a block diagram of a safety auxiliary system associated with the modular battery of FIG. 1.

In greater detail, the first subsystem 10a comprises, for each module 3 of the battery 2 the following elements (which, only for reasons of simplicity of illustration, are depicted only in association with an i-th module of the battery 2 and not also for the other modules 3 of the battery, only the i−1th and i+1th modules of which are illustrated as examples in FIG. 2):

an inlet electrovalve 12, normally closed and electronically controlled to allow entry into the module 3 of a gas with high refrigerating and extinguishing effect (for example $CO_2$ or other suitable gas, such as one of the Halon substitutes);

an outlet electrovalve 14, normally closed and electronically controlled to allow gas (in particular the refrigerant gas introduced from the outside, but also the possible gas produced by the "venting" of one or more overheated cells 4) to escape from the module 3, thereby avoiding the creation of dangerous overpressure inside the module 3;

a group of sensors 15 positioned inside the module 3 and configured to generate detection signals associated with quantities indicative of a thermal runaway in progress, possibly before the phenomenon produces "venting" of one or more cells 4 of the module 3; and a first electronic control unit 16, for example comprising a microprocessor, a microcontroller, a FPGA or an analogous programmable logic unit, operatively coupled to the group of sensors 15, to acquire the detection signals, and moreover to the inlet and venting electrovalves 12, 14, to control, with suitable logics and timings (as will be described in detail hereinafter), opening and closing of the same inlet and venting electrovalves 12, 14.

The aforementioned first electronic control unit 16 is shown schematically outside of the container 3' of the corresponding module 3, but it is clear that it can also be housed inside the same container 3', in which case, with suitable protection from possible fires.

In greater detail, the group of sensors 15 may comprise one or more of the following:

one or more temperature sensors 15a, located in the module 3 in the proximity of the cells 4 (it should be noted that a maximum responsiveness, and thus the maximum safety level, can be obtained with a single temperature sensor 15a per cell 4, configured to detect the temperature of the single cell 4 concerned);

a pressure sensor 15b, configured to detect the pressure value inside the module 3 and therefore the existence of overpressures inside the same module 3 due to the "venting" of one or more cells 4;

a smoke sensor 15c, configured to detect the presence of smoke emitted by a cell 4 in the "venting" phase.

It should be noted that, advantageously, the group of sensors 15 may comprise all of the sensors listed earlier, to maximise the efficiency in the detection of the conditions indicative of the existence of a thermal runaway of one or more cells 4 of the module 3.

In the embodiment illustrated in the aforementioned FIG. 2, the first subsystem 10a also comprises a safety valve 17, connected in parallel to the outlet electrovalve 14, configured to define, in the case of overpressure inside the module 3 (i.e. a pressure between inside and outside of the corresponding container 3' greater than a given predetermined threshold), a venting path for gas to escape from the module 3 towards an outlet manifold (as described hereinafter), bypassing the same outlet electrovalve 14. Such a safety valve 17 thus allows to avoid damage or breaking of the container 3' of the module 3, in the case for example of incorrect readings by the group of sensors 15 (or damage to the same sensors) or failed introduction of the refrigerant gas (for example through a failure or exhaustion of the same refrigerant gas).

In greater detail, the inlet electrovalve 12 of each module 3 (which is shown schematically in a position outside of the module 3, but that may be physically located in the proximity of the container 3' of the same module 3) is coupled, by means of a common manifold 20 (which is in common between at least some of the modules 3 of the battery 2), to at least one container 22 of refrigerant/extinguishing gas.

In particular, the container 22 is provided with a respective electrovalve 23 (illustrated schematically in FIG. 2) and with a corresponding control unit (not shown for the sake of simplicity in FIG. 2), so that the delivery of gas takes place only upon electronic command, in the case of need; this allows to keep the pipes at atmospheric pressure except at the moment of actual use. By cooperating with the control unit of the container 22, the first electronic control unit 16 of every single module 3 is capable of activating the container 22 independently from the other modules 3, so as to determine the delivery of the refrigerant gas selectively and exclusively inside the corresponding container 3'.

The outlet electrovalve 14 of each module 3 (which is also shown schematically in a position outside the module 3, but that may be physically located at the container 3' of the same module 3) is connected to an outlet manifold 24, common to all of the modules 3 and connected to the second subsystem 10b of the safety auxiliary system 10, having the function of managing the accumulation and the expulsion of the gases.

In detail, such second subsystem 10b comprises (as illustrated schematically in the aforementioned FIG. 2) the following elements, which are common for all of the modules 3:

an accumulation tank 30, coupled to the outlet manifold 24 and having the purpose of ensuring at any moment the possibility of accumulating gas, limiting the growth of pressure in the pipes;

a gas expulsion unit (so-called "box") 31 (which, in a known way, may be managed by the on-board systems of the underwater vehicle 1, indicated schematically with 32), which allows the gases accumulated in the outlet manifold 24 and in the accumulation tank 30 to be discharged into the sea;

a respective pressure sensor 33, configured to detect the pressure in the outlet manifold 24, for example at the accumulation tank 30;

a discharge electrovalve 34, normally closed and electronically controlled to fluidically connect the accumulation tank 30 to the gas expulsion unit 31, through a non-return valve 35; and a second electronic control unit 36, for example comprising a microprocessor, a microcontroller, an FPGA or an analogous programmable logic unit, operatively coupled to the pressure sensor 33 and also to the discharge electrovalve 34 to control, according to the pressure value detected by the pressure sensor 33, the same discharge electrovalve 34 (as described hereinafter) and therefore place the accumulation tank 30 and the gas expulsion unit 31 in fluid connection.

In particular, the second electronic control unit 36 of the second subsystem 10b and the first electronic control unit 16 of the first subsystem 10a are operatively coupled through a communication connection 38 (of the wired or wireless type).

The mechanism that allows the expulsion into the sea of the gases from the gas expulsion unit 31 may be managed, in a per se known manner (not described here in detail) by on-board systems 32 of the underwater vehicle 1, in a totally analogous way to what is implemented for the expansion tank or other tanks of said underwater vehicle 1 that are emptied and/or filled with seawater.

For example, the mechanism uses a pump that in a first step takes water from the sea and pours it (at higher pressure than hydrostatic pressure) into the gas expulsion unit 31, thereby producing the expulsion of the corresponding content; thereafter, the same pump is used in reverse, taking water from the gas expulsion unit 31 and pouring it into the sea, thereby obtaining the emptying of the box.

Figure 3:
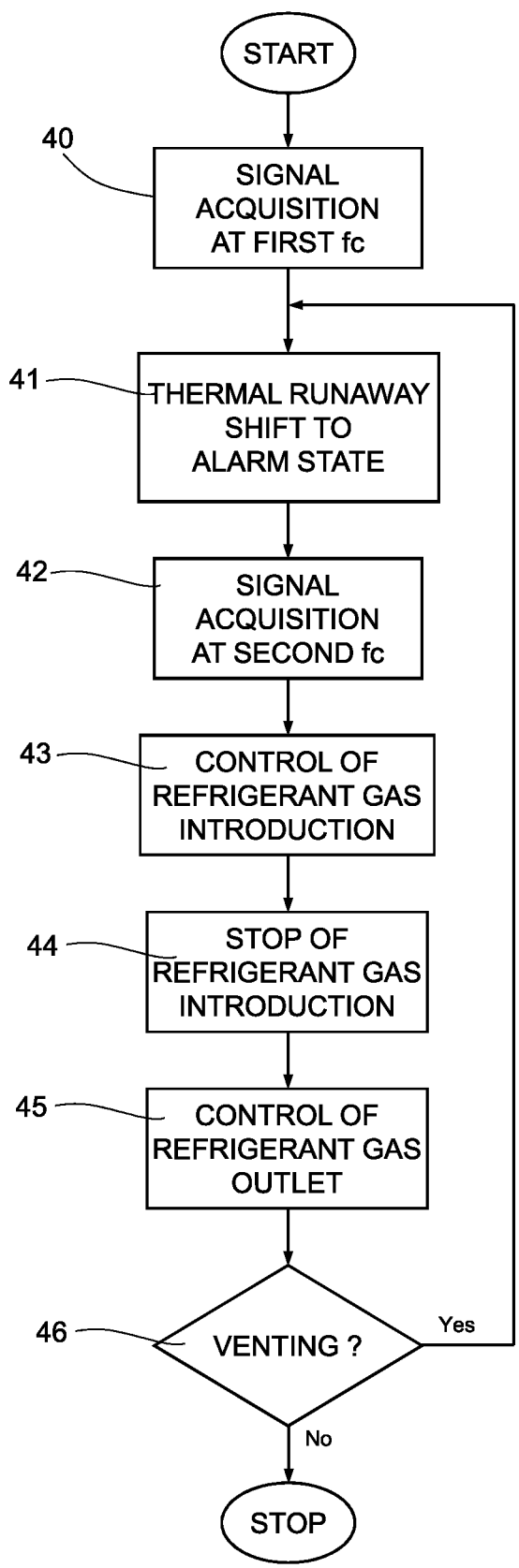
FIGS. 3 and 4 show schematic flow diagrams of operations carried out by a first and by a second subsystems of the safety auxiliary system of FIG. 2.

Operation of the safety auxiliary system 10 is now described in greater detail, firstly referring to the flow diagram of FIG. 3 and to the operations carried out by the first subsystem 10a, aimed at detecting and at managing the thermal runaway of one or more cells 4 of any of the modules 3.

In a rest condition (i.e. with normal operation of the battery 2), step 40, the first electronic control unit 16 of each module 3 acquires, at a first sampling frequency "$f_c$" (for example with sampling period of the order of a second), the detection signals detected by the associated group of sensors 15 (including the temperature sensors 15a, the pressure sensor 15b and the smoke sensor 15c); the same first control unit 16 also monitors the interface with the "BMS" 6 of the module 3.

As soon as a thermal runaway in progress is detected, step 41, the first electronic control unit 16, shifts into an alarm state, which is immediately signalled to the second electronic control unit 36 of the second subsystem 10b, through a suitable alarm signal $S_{al}$ sent through the communication connection 38 between the first and second electronic control unit 16, 36.

As indicated earlier, the thermal runaway can be detected when one or more of the following conditions occur: temperature of one or more cells 4 that exceeds a predetermined threshold; temperature of one or more cells 4 that increases at a greater rate than a respective predetermined threshold; overpressure in the container 3' of the module 3; presence of smoke inside the container 3'.

The signalling of the alarm state may be carried out, by the first electronic control unit 16, also to the "BMS" 6 of the corresponding module 3 (for example by the immediate interruption of an optional charging/discharging step in progress), and moreover to a control system of the underwater vehicle 1 (for example, to the so-called "Combat System" in the case of a submersible, to quickly inform the crew of the dangerous situation).

During the alarm state, step 42, all of the sensors of the group of sensors 5 are sampled at high speed, at a second sampling frequency, higher than the first sampling frequency, so as to be able to accurately detect and monitor the progress of the relevant quantities (in particular, temperature and pressure) inside the module 3.

In alarm conditions the following sequence of actions is also carried out (and optionally repeated):

the first electronic control unit 16 controls, step 43, the opening of the electrovalve 23 arranged on the container 22 of refrigerant gas and, immediately after, controls the opening of the inlet electrovalve 12 of the corresponding module 3, to allow the introduction of the refrigerant gas inside the container 3' (further details on the control logic of the inlet electrovalve 12 will be provided hereinafter); in these conditions, the refrigerant gas flows from the container 22 into the sole module 3 where the thermal runaway has occurred;

at the end of the delivery phase, step 44, once a predetermined pressure value has been reached inside the container 3', or once a certain predetermined time period has elapsed, the first electronic control unit 16 closes both of the electrovalves (the electrovalve 23 of the container 22 and the inlet electrovalve 12 of the module 3) thereby stopping the flow of refrigerant gas to the same module 3.

From this moment, the overheated cell 4 and the other cells 4 give up heat to the refrigerant gas, which thus heats up and, not being able to expand, increases in pressure; at the same time, the temperature of the overheated cell 4 drops sharply.

When the pressure inside the module 3 exceeds a predetermined threshold, or the temperature of the overheated cell 4 stops falling or stops falling at a desired rate (because the cooling effect has run out or is running out), the first electronic unit 16 controls the opening of the outlet valve 14 for a predetermined time, step 45, thereby causing the refrigerant/extinguishing gas (together with the optional gas emitted by the cell 4 in thermal runaway) to come out from the module 3 towards the accumulation tank 30, initially empty (or, more precisely, containing air at atmospheric pressure).

It should be noted that, advantageously, the described process for dispensing refrigerant gas can be repeated once a certain time has elapsed, if the cell 4 again shows great increases in temperature or "venting", as indicated in step 46.

Indeed, it should be noted that, in the case of use of containers 3' with relatively small free volume, the mass of refrigerant gas that may be transferred inside the module 3 without reaching high pressures, is necessarily limited and, consequently, the cooling effect is also limited. It may therefore be required to replace the refrigerant gas in the container 3' many times, as a consequence of the fact that the refrigerant gas heats up and loses cooling capability.

Again for the purpose of limiting the risk of sharp rises in pressure inside the module 3, it is also suitable for the introduction of the refrigerant gas to occur gradually (i.e. with a flow rate control thereof).

Such flow rate control may be obtained, for example, using a proportional electrovalve with electric flow rate adjustment.

In order to reduce the cost of the system, at the same time ensuring efficiency, one aspect of the present solution on the other hand provides for the use of a common "On/Off" electrovalve for the inlet electrovalve 12, which is controlled by the first electronic control unit 16 in pulsed mode, i.e. with a sequence of time-spaced pulses, instead of in a temporally continuous manner.

In particular, the first electronic control unit 16, sampling the pressure in the module 3 at high speed, establishes the width of the control pulses of the inlet electrovalve 12 (i.e. roughly adjusts the average flow rate of the refrigerant gas in a certain time period) so as to ensure that the pressure inside the module 3 quickly reaches the predetermined value, at the same time minimising the risk of overpressures.

The predetermined pressure value is selected sufficiently high as to ensure the required cooling effect and, at the same time, sufficiently below the activation pressure of the safety valve 17, so as not to cause the activation thereof.

It should be noted that the first electronic control unit 16 in this way implements an automatic control in which the set-point is represented by the gas pressure that it is desired to obtain inside the module 3, the control input is represented by the introduction flow rate of the refrigerant gas (adjusted by changing the width of the control pulses of the inlet electrovalve 12), and the "disturbance" (random, uncontrollable phenomenon) is represented by the heat produced by the cell 4 and by the possible "venting" thereof.

Figure 4:
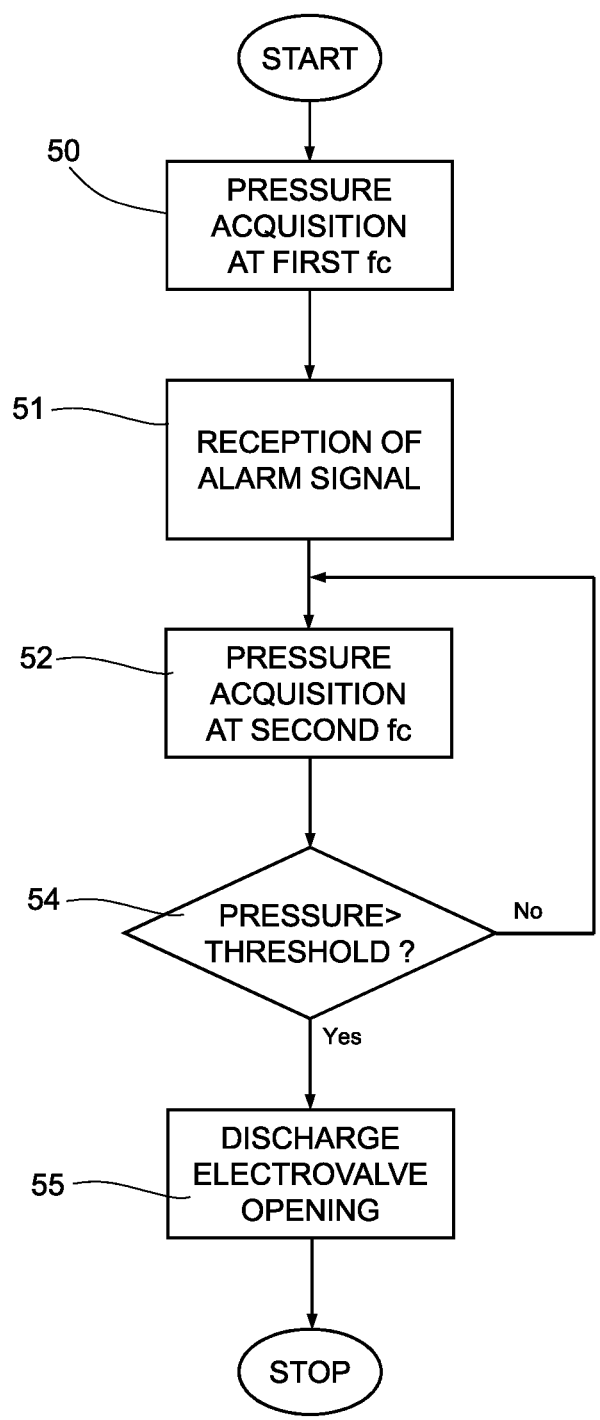

As shown in FIG. 4, the second electronic control unit 36 of the second subsystem 10b (subsystem intended for controlling the accumulation and the expulsion of the gases), constantly controls the pressure in the venting system, step 50, through the acquisition of the signal detected by the pressure sensor 33, associated to the outlet manifold 24 and to the accumulation tank 30.

In normal operating conditions of the battery 2, the monitoring of the pressure takes place at a first sampling frequency, for example at time intervals of a second; in alarm conditions (i.e. upon receiving, step 51, the alarm signal $S_{al}$ sent by the first electronic control unit 16 through the dedicated communication line 38) the measurements are on the other hand carried out at high speed, at a second sampling frequency, higher than the first sampling frequency, step 52.

When the instantaneous reading of the pressure sensor 33 exceeds a predetermined threshold, step 54, the second electronic control unit 36 controls the opening, for example for a predetermined time, of the discharge electrovalve 34, step 55, so as to allow gas to flow in the gas expulsion unit 31.

From the same gas expulsion unit 31, the gases will then be expelled into the sea, so as not to in any way contaminate the internal environment of the underwater vehicle 1.

As indicated earlier, the opening of the discharge electrovalve 34 places the accumulation tank 30 in communication with the gas expulsion unit 31. It should be noted that this does not cause the emptying, but only a reduction in pressure in the accumulation tank 30, the percentage of which is greater as the volume of the gas expulsion unit 31 with respect to the volume of the other components (pipes and accumulation tank itself) is greater.

It is also noted that, for the entire duration of the expulsion operation of the gases (dependent on the solution adopted) the gas expulsion unit 31 cannot be used, therefore all of the gas coming out from the module 3 stays confined only in the pipes and in the accumulation tank 30.

The advantages of the present solution emerge clearly from the above description.

In any case, it should be emphasised that the proposed solution allows to substantially increase the safety of modular rechargeable Lithium batteries, in particular in the case of batteries of large size used in a submersible or more generally in an underwater vehicle.

Advantageously, the refrigerant and extinguishing gas is dispensed only inside the module 3 in which a thermal runaway has occurred, thanks to the presence in the same module of the group of sensors 15 capable of detecting with certainty the presence of a thermal runaway in the initial step (progressive increase in temperature with anomalous rate of increase) or in the subsequent irreversible step (breaking of the cell 4, "venting", increase in pressure inside the module, presence of smoke).

Advantageously, for every single module 3, the corresponding first electronic control unit 16 acquires the detection signals from the sensors of the group of sensors 15 and controls the inlet and venting electrovalves 12, 14 according to an optimised logic in order to maximise the cooling effect without however exceeding dangerous pressures inside the container 3' of the module 3.

Moreover, adjustment of the introduction flow rate of the refrigerant gas into the module 3 allows to minimise the risk of overpressures, controlling the inlet valve 12 with a sequence of pulses of variable width (which is determined in a suitable manner by the control logic).

The outlet manifold 24, connected to the accumulation tank 30, allows to avoid contaminating the internal air of the underwater vehicle 1 with the refrigerant gas (for example $CO_2$) and the "venting" gases produced by the cells 4.

The same accumulation tank 30 may advantageously be emptied (at least partially) automatically, through the "gas expulsion box" managed by the on-board systems 32 of the underwater vehicle 1, which allows the expulsion into the sea of the gases contained in it.

The communication of the alarm signal $S_{al}$ by the first control unit 16 of the first subsystem 10a to the second control unit 36 of the second subsystem 10b of the safety auxiliary system 10 allows to accurately monitor the pressure in the aforementioned accumulation tank 30 and to immediately cause the emptying thereof, thereby ensuring the possibility of disposing of the gas that escapes from the module 3 without the same gas contaminating the internal environment of the underwater vehicle 1.

Finally, it is clear that modifications and variants can be brought to what has been described and illustrated here without for this reason departing from the scope of protection of the present invention, as defined in the attached claims.

In particular, in the case of large batteries 2, the supply pipes of the refrigerant gas could be of excessive length, compromising or in any case reducing the cooling efficiency of the same gas. In this hypothesis, the modules 3 may be grouped in a certain number N of groups and, instead of a single container 22, it may be possible to use N containers 22 of reduced capacity (each of which is used for a single group) physically positioned close to the modules 3 that make up the corresponding group.

It should also be noted that the accumulation tank 30 may be generally sized for a volume indicatively equal to the maximum volume of gas emitted by a single cell 4 in the case of "venting"; for example, for cells 4 having a mass of 1 Kg, it is possible to provide a volume of the order of 200 litres.

In the hypothesis that the safety auxiliary system 10 manages to prevent the propagation of the "venting" to the nearby cells 4, all of the gas emitted by the battery 2 may optionally stay contained in the system and in the accumulation tank 30 even without using the mechanism for expulsion into the sea.

Moreover, a further aspect of the present solution may provide that the first electronic control unit 16, in the case of sudden interruption of the connections between the same first electronic control unit 16 and the group of sensors 15 or sudden change in the data provided by them, due to damage to the sensors (since there is the possibility that the fire of the module 3 might destroy or damage the group of sensors 15), prudently assumes that there is an "alarm and fire in progress" condition and therefore activates the inlet electrovalve 12 to put out the same fire. It should be noted that, in this particular case, the first electronic control unit 16 has no way of knowing whether the intervention has produced positive results, given that it will no longer be possible to use the signals coming from the sensors as "feedback". In this case, the first inlet electrovalve 12 will therefore be activated for a predetermined time and the same will happen for the outlet electrovalve 14.

Finally, it should again be highlighted that the present solution is advantageously applicable to increase the safety of a battery 2 preferably for use in a marine environment, for example inside a generic underwater vehicle, which may also differ from the submarine that has been specifically referred to earlier.

The invention claimed is:

1. A safety auxiliary system, operatively coupled to a modular battery having a number of modules, each module provided with a plurality of cells, and a battery management system designed for managing the operation of the number of modules, said safety auxiliary system being configured to operate in addition to, and in cooperation with, said battery management system and comprising:
   a first subsystem, configured to detect conditions indicative of a thermal runaway in any one module of said number of modules and to manage said thermal runaway, intervening locally on said any one module to cool the corresponding cells so that the thermal runaway is not propagated; and
   a second subsystem, cooperating with, and operatively coupled to, the first subsystem, configured to manage gas present in the any one module associated with the thermal runaway, preventing leaking thereof in an environment where said modular battery is located;
   wherein said first subsystem comprises a first electronic control unit for each module of said number of modules, and said second subsystem comprises a second electronic control unit distinct from, and operatively coupled to, said first electronic control unit through a communication connection, so as to receive an alarm signal ($S_{al}$) upon detection of said conditions indicative of the thermal runaway in the corresponding any one module;
   wherein each module of said number of modules is provided with a corresponding hermetic container which encloses the corresponding cells, and wherein said first subsystem comprises, for each module of said number of modules:
   an inlet electrovalve coupled, by means of a common manifold, in common with said number of modules, to at least one container of refrigerant gas, electronically controlled by said first electronic control unit to allow inlet of said refrigerant gas into the corresponding module following the detection of said conditions indicative of a thermal runaway;
   an outlet electrovalve, electronically controlled by said first electronic control unit to allow outflow of gas from the corresponding module towards an outlet manifold; and
   a group of sensors positioned inside the corresponding module and coupled with said first electronic control unit to provide detection signals associated with quantities indicative of said thermal runaway;
   and wherein said second subsystem comprises:
   said outlet manifold, common to said modules and connected to said modules through the corresponding outlet electrovalve;
   a gas accumulation tank, coupled to the outlet manifold; and
   a discharge electrovalve, electronically controlled by said second electronic control unit to fluidically connect said gas accumulation tank to a gas expulsion unit.

2. The system according to claim 1, wherein said first electronic control unit is configured to control said inlet electrovalve to control the flow rate of the refrigerant gas introduced into said corresponding module from said container, thereby avoiding overpressures inside the corresponding module.

3. The system according to claim 2, wherein said first electronic control unit is configured to control said inlet electrovalve in pulsed mode, with a sequence of time-spaced control pulses, wherein the width of the control pulses is adjusted as a function of the pressure inside the corresponding module and of a target pressure value to be reached, to ensure that the pressure inside the corresponding module reaches the target pressure value, avoiding overpressures.

4. The system according to claim 1, wherein said group of sensors comprises at least one of:
  one or more temperature sensors, located in the corresponding module in the proximity of the cells;
  a pressure sensor, configured to detect the pressure inside the corresponding module; and
  a smoke sensor, configured to detect the presence of smoke emitted by a cell due to the thermal runaway.

5. The system according to claim 4, wherein said first electronic control unit is configured to sample the signals detected by the sensors of said group of sensors at a first sampling frequency in a normal operating condition, and at a second sampling frequency, higher than said first sampling frequency, following the detection of said conditions indicative of a thermal runaway.

6. The system according to claim 1, wherein said first subsystem further comprises a safety valve connected in parallel to the outlet electrovalve, configured to define, in the event of overpressure inside the corresponding module, a venting path for the outflow of gas from the corresponding module towards said outlet manifold.

7. The system according to claim 1, wherein said container is provided with a respective electrovalve and a corresponding control unit cooperating with the first electronic control unit of each module to allow the delivery of gas from the container any module of said number of modules, independently of the other modules of said number of modules.

8. The system according to claim 1, wherein said second subsystem comprises a pressure sensor, configured to detect the pressure in the outlet manifold and/or in said gas accumulation tank; wherein said second electronic control unit is operatively coupled to said pressure sensor and to the discharge electrovalve to control, according to the pressure value detected by the pressure sensor, said discharge electrovalve to fluidically connect said gas accumulation tank to said gas expulsion unit in order to expel the gas outside of the environment where said battery is located.

9. The system according to claim 8, wherein said second electronic control unit is configured to sample the signal detected by said pressure sensor at a first sampling frequency in a normal operating condition, and at a second sampling frequency, higher than said first sampling frequency, following reception of said alarm signal ($S_{al}$) from said first electronic control unit.

10. The system according to claim 8, wherein said battery is located in an underwater vehicle and wherein said gas expulsion unit is an expulsion module for discharging into the sea the gas accumulated in the outlet manifold and in the accumulation tank.

11. The system according to claim 1, wherein said battery is a rechargeable Lithium battery.

12. A battery having a number of modules, each provided with a plurality of cells, comprising a safety auxiliary system according to claim 1.

13. The battery according to claim 12, wherein the battery comprises a rechargeable Lithium battery.

14. An underwater vehicle comprising a battery having a number of modules, each module of the number of modules provided with a plurality of cells and the safety auxiliary system according to claim 1.

* * * * *